United States Patent
Stenard

(10) Patent No.: US 7,815,160 B2
(45) Date of Patent: Oct. 19, 2010

(54) COMPOSITE MANDREL

(75) Inventor: Steven Stenard, Cincinnati, OH (US)

(73) Assignee: A & P Technology, Cincinnati, OH (US)

( * ) Notice: Subject to any disclaimer, the term of this patent is extended or adjusted under 35 U.S.C. 154(b) by 0 days.

(21) Appl. No.: 11/694,411

(22) Filed: Mar. 30, 2007

(65) Prior Publication Data

US 2007/0261788 A1 Nov. 15, 2007

Related U.S. Application Data

(60) Provisional application No. 60/789,031, filed on Apr. 4, 2006.

(51) Int. Cl.
*B29C 33/40* (2006.01)
*B29C 70/34* (2006.01)

(52) U.S. Cl. .............. 249/114.1; 156/307.1; 425/322; 264/103; 264/113; 264/136; 264/137

(58) Field of Classification Search ............ 249/114.1; 264/313, 103, 114.1
See application file for complete search history.

(56) References Cited

U.S. PATENT DOCUMENTS

| | | | | |
|---|---|---|---|---|
| 3,880,336 | A * | 4/1975 | Demasson | 294/165 |
| 3,942,583 | A * | 3/1976 | Baur | 164/246 |
| 3,988,103 | A * | 10/1976 | Hoffmeister | 425/403 |
| 4,081,220 | A | 3/1978 | Andrews | |
| 4,230,293 | A | 10/1980 | Hamm et al. | |
| 4,242,160 | A | 12/1980 | Pinter et al. | |
| 4,278,485 | A | 7/1981 | Hamm et al. | |
| 4,307,755 | A | 12/1981 | Schmidt et al. | |
| 4,459,171 | A | 7/1984 | McKinney | |
| 4,532,169 | A | 7/1985 | Carley | |
| 4,614,626 | A * | 9/1986 | Frerking | 264/46.4 |
| 4,629,190 | A * | 12/1986 | Borgen | 473/560 |
| 4,867,889 | A * | 9/1989 | Jacobson | 508/106 |

(Continued)

FOREIGN PATENT DOCUMENTS

EP 0423915 A 4/1991

(Continued)

OTHER PUBLICATIONS

Kumar, Satish and V.B. Gupta. "Manufactured fibres for high performance, industrial and non-conventional applications." In Manufactured Fibre Technology. Chapman & Hall: New York, 1997. p. 546.*

*Primary Examiner*—Alexa D Neckel
*Assistant Examiner*—Magali P Slawski
(74) *Attorney, Agent, or Firm*—Hahn, Loeser & Parks, LLP

(57) ABSTRACT

A mandrel for use as a substrate in the manufacture of woven or braided articles may comprise an inner core of foam; at least a first intermediate layer of carbon fiber-reinforced resin; and an outer layer of glass fiber-reinforced resin. The foam core may comprise a high density, closed cell polyurethane foam that is formed of a desired size and shape. The fibers in the intermediate layer and outer layer may be, for example, chopped fibers, continuous longitudinally aligned fibers, circumferentially wound fibers, obliquely aligned fibers, or the fibers may have a woven or braided pattern. Multiple mandrel may be joined together to form complex mandrel shapes such as curves, ovals, and circles.

20 Claims, 4 Drawing Sheets

U.S. PATENT DOCUMENTS

| | | | |
|---|---|---|---|
| 4,921,151 A * | 5/1990 | Duvall | 224/438 |
| 5,022,845 A | 6/1991 | Charlson et al. | |
| 5,031,846 A | 7/1991 | Lea et al. | |
| 5,151,144 A | 9/1992 | Chlupsa | |
| 5,173,315 A | 12/1992 | Charlson et al. | |
| 5,333,857 A * | 8/1994 | Lallemand | 473/561 |
| 5,368,911 A | 11/1994 | Mannava et al. | |
| 5,388,497 A | 2/1995 | Akiyama et al. | |
| 5,398,586 A | 3/1995 | Akiyama et al. | |
| 5,409,642 A | 4/1995 | Allen et al. | |
| 5,424,113 A | 6/1995 | Ray et al. | |
| 5,427,741 A | 6/1995 | Bennett | |
| 5,470,651 A | 11/1995 | Milinkovic et al. | |
| 5,474,632 A | 12/1995 | Ray et al. | |
| 5,482,340 A | 1/1996 | Jensen et al. | |
| 5,600,912 A * | 2/1997 | Smith | 42/76.01 |
| 5,660,350 A | 8/1997 | Byrne et al. | |
| 5,667,162 A | 9/1997 | McNeil et al. | |
| 5,667,228 A | 9/1997 | Fabris | |
| 5,679,159 A | 10/1997 | Olson | |
| 5,690,297 A | 11/1997 | McNeil et al. | |
| 5,698,066 A | 12/1997 | Johnson et al. | |
| 5,732,901 A | 3/1998 | McNeil et al. | |
| 5,810,282 A | 9/1998 | McNeil et al. | |
| 5,876,537 A | 3/1999 | Hill et al. | |
| 5,897,922 A | 4/1999 | Saxena et al. | |
| 5,899,118 A * | 5/1999 | Satoh et al. | 74/552 |
| 5,899,404 A | 5/1999 | McNeil et al. | |
| 5,913,490 A | 6/1999 | McNeil et al. | |
| 5,924,193 A | 7/1999 | Crumly et al. | |
| 5,939,011 A | 8/1999 | White et al. | |
| 5,983,495 A | 11/1999 | Popoola et al. | |
| 6,142,407 A | 11/2000 | McNeil et al. | |
| 6,250,193 B1 | 6/2001 | Head | |
| 6,261,500 B1 | 7/2001 | Park et al. | |
| 6,354,530 B1 | 3/2002 | Byrne et al. | |
| 6,354,960 B1 | 3/2002 | Perryman et al. | |
| 6,423,388 B1 | 7/2002 | Bateson et al. | |
| 6,444,071 B1 | 9/2002 | Ayorinde | |
| 2003/0144071 A1 * | 7/2003 | Dodge et al. | 473/316 |

FOREIGN PATENT DOCUMENTS

| | | |
|---|---|---|
| SU | 1456524 A1 * | 2/1989 |
| WO | WO 2005102742 A1 * | 11/2005 |

* cited by examiner

COMPOSITE MANDREL

This application claims the benefit of U.S. provisional patent application 60/789,031, entitled "Composite Mandrel" and filed Apr. 4, 2006, which is hereby incorporated herein by reference.

TECHNICAL FIELD

The present invention relates to an improved mandrel for producing near-net shape composite preforms thereon.

BACKGROUND OF THE INVENTION

It is known in the art of manufacturing articles comprising composite materials to first form a mandrel upon which the composite product is preformed. In the prior art, such mandrels are typically manufactured from solid wood, laminated wood, and/or metallic materials.

In the manufacture of a curved composite preform product, the prior art mandrels made of wood often exhibit an instability that results in non-uniformity of the composite product being formed thereon. While metallic mandrels may tend to solve the wooden mandrels' instability, they are nevertheless subject to thermal instability caused by ambient temperature changes.

What is needed is a mandrel that exhibits dimensional and thermal stability in the work environment.

BRIEF SUMMARY OF THE INVENTION

Figure 1:
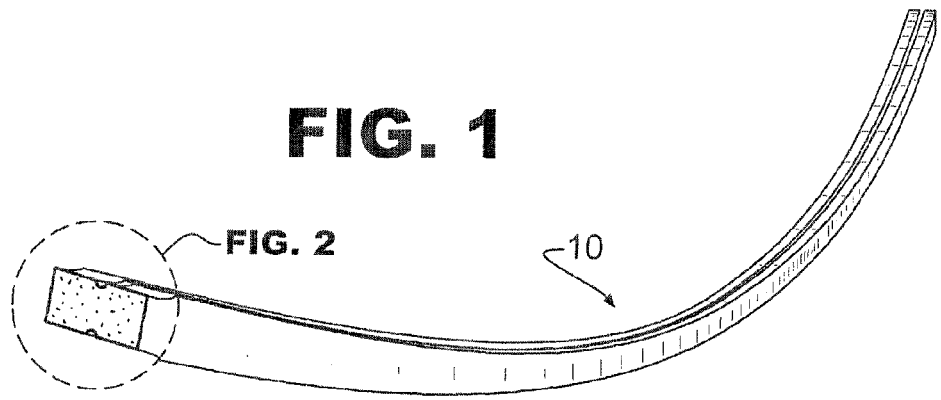
FIG. 1 is a perspective view of a composite mandrel.

One embodiment of a mandrel for use as a substrate in the manufacture of woven or braided articles may comprise an inner core of foam and at least a first layer of fiber-reinforced resin. Carbon fibers may be used as the reinforcement of the resin. Multiple carbon fiber-reinforced resin layers may be applied to the foam core.

A further embodiment of a composite mandrel for use as a substrate in the manufacture of woven or braided articles may comprise a longitudinally-extending mandrel body having: an inner core of high density, closed cell polyurethane foam; an intermediate layer of carbon fiber-reinforced resin about the core; and an outer layer of glass fiber-reinforced resin about the intermediate layer.

A still further embodiment comprises a method of making a mandrel that is used as a substrate in the manufacture of a woven or braided article, comprising the steps of: providing a mandrel core of foam; overlaying the foam core with a sleeve of carbon fibers; applying a resin to the carbon fibers to create a carbon fiber-reinforced resin layer; after the carbon fiber-reinforced resin layer cures, overlaying the carbon fiber-reinforced resin layer with a sleeve of glass fibers; and, applying a resin to the glass fibers to create a glass fiber-reinforced resin layer.

In one or more embodiments, the mandrel comprises a core of closed cell, high density, polyurethane foam overlaid with at least one, but preferably two or more, layers of carbon fiber reinforced resin and at least one outer layer of glass fiber reinforced resinous material. It is also contemplated that other types of foam may also be utilized with the embodiments of present invention. The foam core is first shaped to the shape desired for the final mandrel, after which the layers of reinforced carbon and glass fiber are applied.

Embodiments of the composite mandrel construction, taught herein, impart higher stiffness and lower weight than prior art mandrel constructions, thereby facilitating automatic and/or semi-automatic application of wrinkle-free, or undulation-free, composite material layers in the composite preform as it is applied, and/or cured upon the mandrel.

A plurality of composite mandrels, as taught herein, may be joined together to create more complex shapes, such as axially tandem straight, circular, or non-circular profiles along the longitudinal axis of the mandrels, thereby facilitating the manufacture of multiple composite preforms in a single manufacturing operation.

The longitudinal and cross-sectional profiles of embodiments of the composite mandrel may comprise varying geometry, thereby imparting desired variations into the geometry of the final preform configuration. The profile configuration may be generated by hand or by automated or semi-automated machine tools employing Computer Aided Design (CAD) manufacturing software programs.

Thus, one advantage of one of the embodiments of the invention is to provide a dimensionally-stable composite mandrel for producing near-net shape composite preforms thereon that overcome one or more of the shortcomings of the prior art.

It is a further advantage of one of the embodiments of the present invention to provide a composite mandrel for producing near-net shape composite preforms thereon, whereby composite fibers may be braided or otherwise applied to be later infused with a binding agent in a mold and formed into a final composite product using a plurality of composite manufacturing methods.

DETAILED DESCRIPTION OF THE INVENTION

Figure 5:
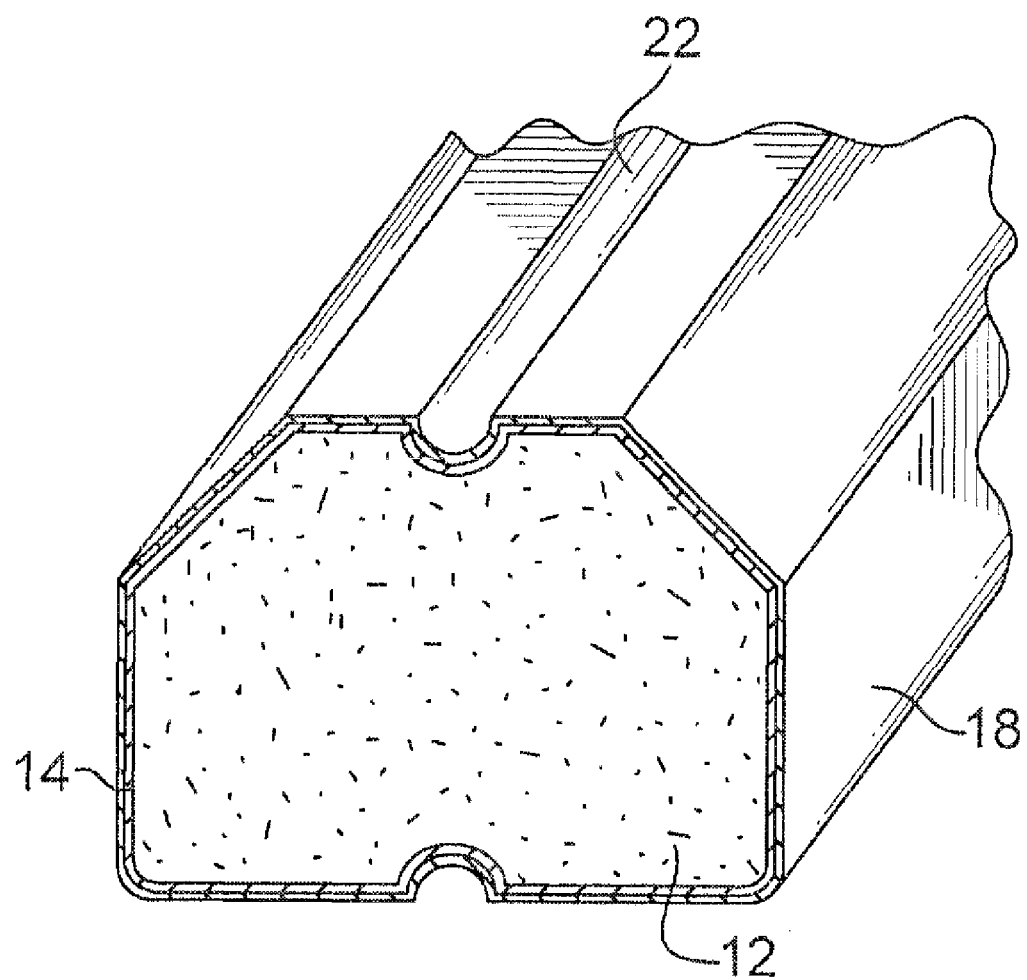
FIG. 5 is a cross-sectional view of a second embodiment of a composite mandrel.

FIG. 1 generally illustrates a mandrel 10, having a curved axial profile, embodying an embodiment of the present invention. Mandrel 10 may also embody a longitudinally straight profile or any of a plurality of axial profiles. Although the lateral cross-section of mandrel 10 is illustrated as generally having a rectangular cross-section, mandrel 10 may alternately embody any of a plurality of desired cross-sectional profiles, or may include a varying cross-section along its longitudinal length. For example, the mandrel illustrated in FIG. 5 is but one of a multitude of cross-sectional profiles that can be utilized. As such, any shape, size, and curvature of mandrel is contemplated for use in the different embodiments of the present invention.

Figure 2:
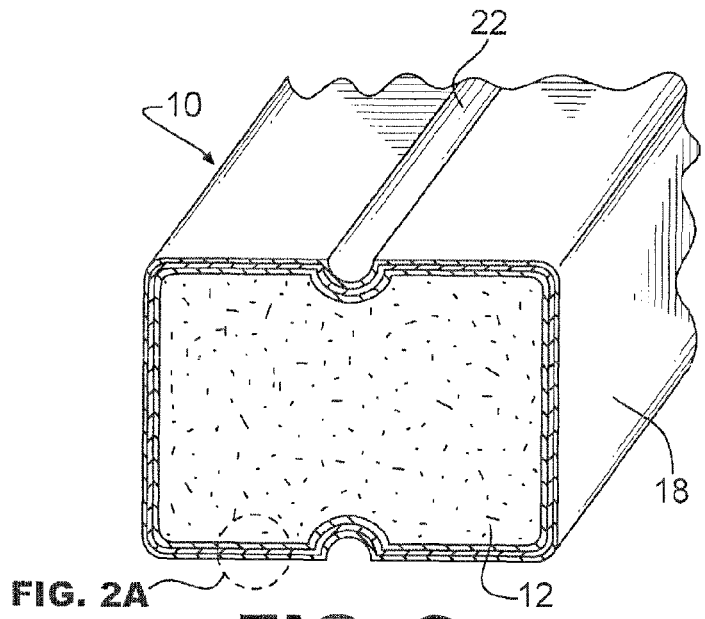
FIG. 2 is a cross-sectional view of the mandrel illustrated in FIG. 1.
Figure 2A:
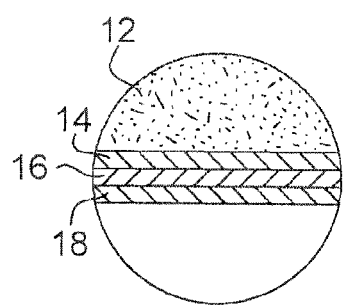
FIG. 2A is an enlarged view of the portion circled in FIG. 2.

Referring now to FIGS. 2 and 2A, mandrel 10 may comprise a high density, polyurethane foam core 12 having a first over-wrapped layer 14 of carbon fiber-reinforced resinous material, an optional second over-wrapped layer 16 of carbon fiber-reinforced resinous material, and a third outer layer 18 of glass fiber-reinforced resinous material. Optionally, the second layer 16 of carbon fiber-reinforced resinous material may be omitted or multiple layers of carbon fiber-reinforced resinous material may be added.

In manufacturing the composite mandrel 10, the foam core 12 may be first formed to the shape and contour of the desired mandrel using known methods of forming foam products. Once having the pre-shaped foam core, the first over-wrapped layer 14 of carbon fiber reinforced resinous material is applied and allowed to cure, followed by the optional second carbon fiber over-wrapped layer 16, and the final outer layer 18 of glass fiber reinforced resinous material.

In one embodiment of manufacturing the composite mandrel 10, a sleeve of carbon fibers is applied over the foam core. The carbon fibers may be longitudinally or axially-aligned fibers at least partially woven or braided with an elastomeric fiber or member that may extend obliquely around the sleeve. Alternatively, the carbon fibers, themselves, may be partially or substantially braided or woven. The core with overlapped carbon fibers may be placed into an article or bag whereby a vacuum is pulled at one end and resin is introduced at another end, which pulls the resin over the core/fiber combination to form the carbon fiber-reinforced layer. Alternatively, the resin may be applied to the carbon fibers by hand or by brush. After the carbon fiber-reinforced layer cures, a fiberglass, or glass fiber, sleeve may applied over the carbon fiber-reinforced layer. Similarly, the core/carbon fiber-reinforced resin member may be placed in a similar article or bag whereby a vacuum is pull at one end and resin is drawn over the glass fibers, forming the glass fiber-reinforced layer. Again, alternatively, the resin may be applied by hand or brush.

Any of a plurality of resins may be used in accordance with embodiments of the present invention. For example, in one embodiment, the resin is a vinyl ester resin that cures at room temperature. Other embodiments of resins that may be used include, but are not limited to, epoxy resins.

A varying cross-section of mandrel 10 may be accomplished by forming a foam core having a variable cross-section along its longitudinal length, or by varying the number and/or thickness of the over-wrapped layers 14, 16, 18.

The over-wrapped layers 14, 16, and 18 may comprise chopped fibers, continuous longitudinally aligned fibers, circumferentially wound fibers, a woven or braided pattern, or any other desired reinforcing pattern. Each layer 14, 16, and/or 18 may comprise differing fiber reinforcing patterns as may be desired.

The composite mandrel serves as a dimensionally stable substrate onto which a matrix of reinforcing fibers is applied.

Multiple layers of fiber reinforcing of the same or differing composition may be braided or otherwise applied to the foam core using apparatus and method as taught in U.S. Pat. No. 5,398,586, which is hereby incorporated herein by reference, and each layer may or may not extend the longitudinal length of the mandrel, thereby allowing for complex geometries to be built up using an automatic or semi-automatic process.

Braided fiber patterns applied directly upon the composite mandrel core 12 eliminate the labor-intensive process of hand lay-up or semi-automated lay-up of complex composite preforms using woven fabric, sleeved, or braided fabric materials. Further, the axial and tow fibers of multiple braided layers may be accurately aligned by automatic or semi-automatic equipment.

Figure 3:
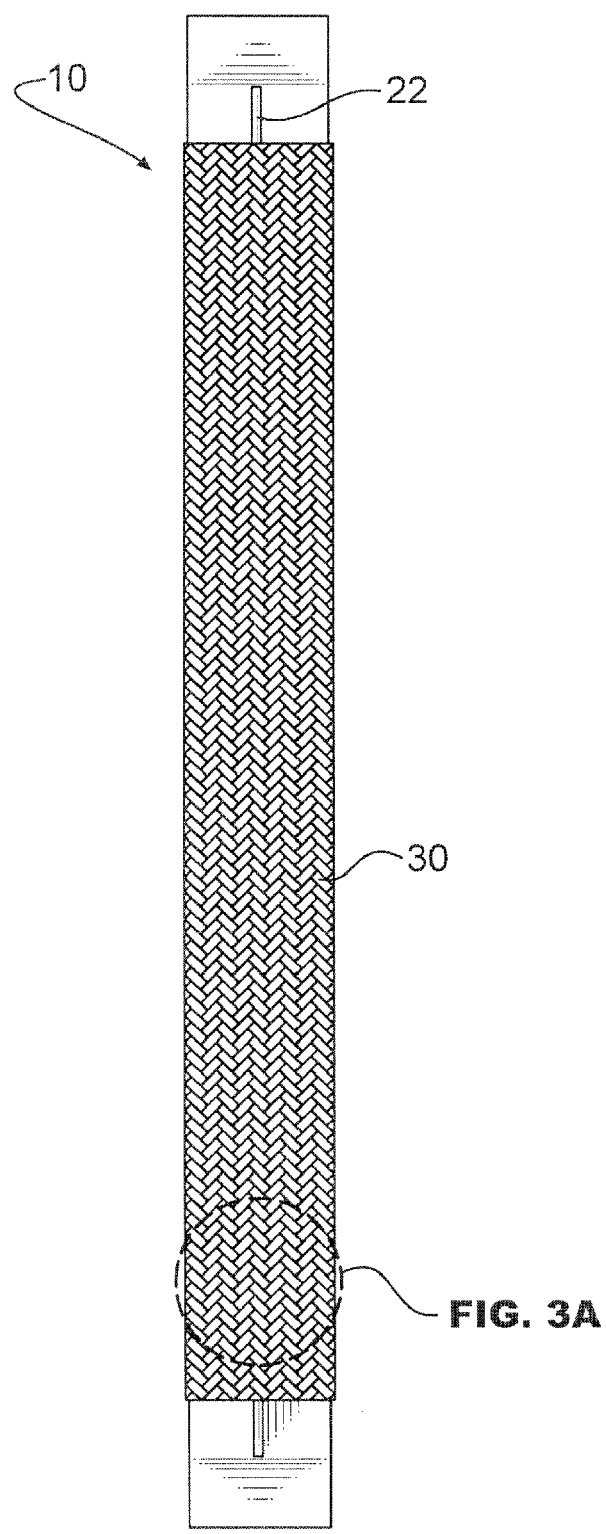
FIG. 3 is a side elevational view of a composite mandrel wrapped thereabout with a braided, fibrous product.
Figure 3A:
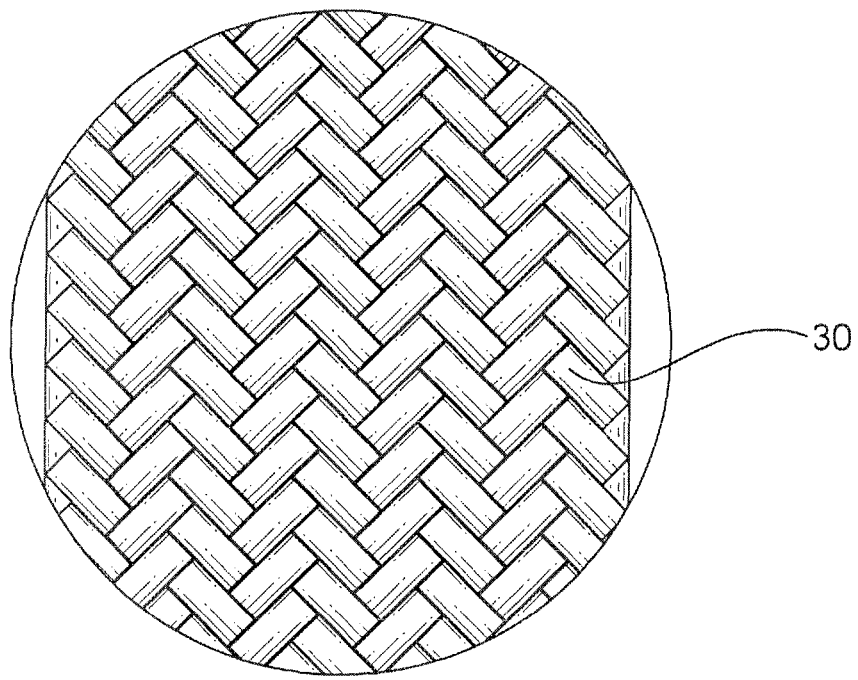
FIG. 3A is an enlarged view of the braided fibrous product over-wrapping the mandrel and, FIG. 4 is a perspective view of a multiplicity of non-linear mandrels attached, end to end, to form a circular mandrel assembly using splice plates.

In use, the mandrel 10 may be used as a substrate upon which woven or braided articles 30 are formed. For example, FIGS. 3 and 3A illustrate a woven or braided, article 30 formed over the mandrel 10. The mandrel may have a longitudinally-extending cutting groove in a side thereof. Alternately or in addition, as shown in FIGS. 1-3, the mandrel 10 may further comprise a cutting groove such as longitudinally-extending cutting groove 22 formed in two sides of the mandrel 10.

Figure 4:
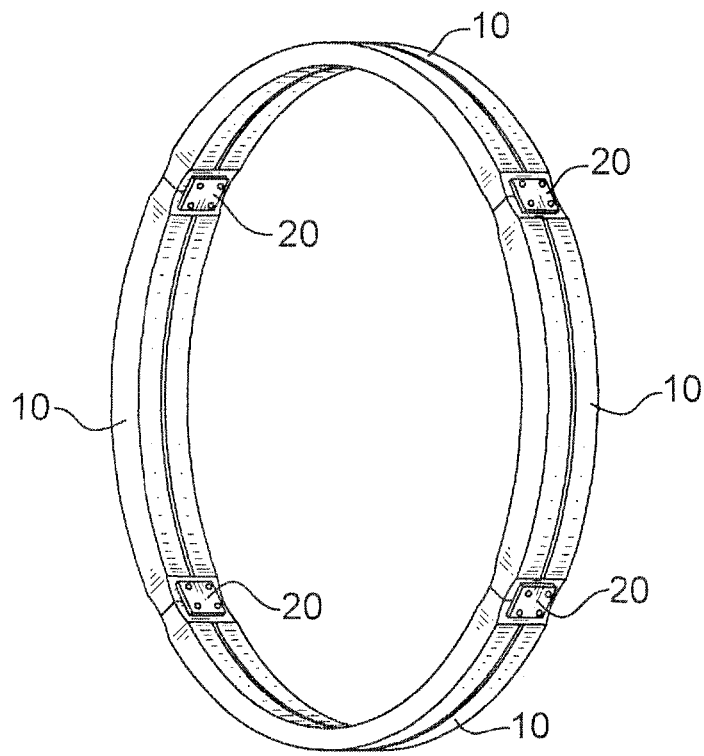

Multiple composite mandrels 10 may be affixed together using splice plates 20 attached to the mandrel ends thereby facilitating construction of a more complex shape as illustrated in FIG. 4.

While we have described above the principles of our invention in connection with a specific embodiment, it is to be clearly understood that this description is made only by way of example and not as a limitation of the scope of the invention.

Although the present invention has been described above in detail, the same is by way of illustration and example only and is not to be taken as a limitation on the present invention. Accordingly, the scope and content of the present invention are to be defined only by the terms of the appended claims.

The invention claimed is:

1. A mandrel for use as a substrate in the manufacture of woven or braided articles, comprising:
   a mandrel body adapted for use as a substrate in the manufacture of woven or braided articles having:
      an inner core of foam having two ends and one or more sides; and,
      a first layer of carbon fiber-reinforced resin in contacting engagement with the inner core and enveloping each of the one or more sides of the foam core, the carbon fibers axially-aligned relative to an axis of the mandrel body and resilient fibers transverse to the carbon fibers in the first layer.

2. The mandrel as recited in claim 1, further comprising a second carbon fiber-reinforced resin layer enveloping the first carbon fiber-reinforced resin layer.

3. The mandrel as recited in claim 2, further comprising a glass fiber-reinforced resin layer enveloping the second carbon fiber-reinforced resin layer.

4. The mandrel as recited in claim 1, further comprising a glass fiber-reinforced resin layer enveloping the carbon fiber-reinforced resin layer.

5. The mandrel as recited in claim 4, wherein the fibers in at least one of the carbon fiber-reinforced resin layer and the glass fiber-reinforced resin layer are at least partially braided.

6. The mandrel as recited in claim 5, wherein the axially-aligned fibers in the carbon fiber-reinforced resin layer comprise carbon fibers, the carbon fibers being at least partially braided with the resilient fiber.

7. The mandrel as recited in claim 5, wherein the glass fibers in the glass fiber-reinforced layer are substantially braided.

8. The mandrel as recited in claim 4, wherein the foam core is high density closed cell polyurethane.

9. In combination:
   a plurality of mandrels as recited in claim 1 joined together to form a mandrel assembly adapted for use as a substrate in the manufacture of woven or braided articles.

10. The mandrel assembly as recited in claim 9, wherein the shape is circular or non-circular.

11. The mandrel assembly as recited in claim 9, wherein the mandrels are connected to each other by splice plates.

12. The mandrel as recited in claim 3, wherein the glass fibers in the glass fiber-reinforced layer are substantially braided.

13. The mandrel as recited in claim 1, wherein the mandrel has a longitudinally-extending cutting groove in a side thereof.

14. The mandrel as recited in claim 5, where the mandrel is non-linear.

15. A mandrel for use as a substrate in the manufacture of woven or braided articles, comprising:
- a mandrel body adapted for use as a substrate in the manufacture of woven or braided articles having:
- an inner core of foam having two ends and one or more sides; and,
- a first layer of carbon fiber-reinforced resin in contacting engagement with the foam core and enveloping each of the one or more sides of the foam core, the carbon fibers axially-aligned relative to an axis of the mandrel body, and resilient fibers transverse to the carbon fibers in the first layer, and
- a second layer of carbon fiber-reinforced resin enveloping the first layer of fiber and the foam core, the second layer comprising fibers axially-aligned relative to an axis of the mandrel body.

16. The mandrel as recited in claim 15, further comprising a glass fiber-reinforced resin layer enveloping the second carbon fiber-reinforced resin layer.

17. The mandrel as recited in claim 16, wherein the glass fibers in the glass fiber-reinforced layer are substantially braided.

18. The mandrel assembly as recited in claim 15, wherein the shape of the mandrel body is arcuate.

19. In combination:
- a plurality of mandrels as recited in claim 15 joined together to form a mandrel assembly adapted for use as a substrate in the manufacture of woven or braided articles.

20. The mandrel assembly as recited in claim 15, wherein the shape is circular or non-circular.

* * * * *